United States Patent
Kumar et al.

(10) Patent No.: US 11,947,516 B1
(45) Date of Patent: Apr. 2, 2024

(54) MULTI-TIER DEFINITION MANAGEMENT FOR DISTRIBUTED DATA STORES

(71) Applicant: Amazon Technologies, Inc., Reno, NV (US)

(72) Inventors: Ankit Kumar, Bellevue, WA (US); Alazel Acheson, Redmond, WA (US); Jasmeet Chhabra, Bellevue, WA (US); Luke Edward Kennedy, Seattle, WA (US); Daniel Stephen Popick, Seattle, WA (US); Weixun Wang, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 804 days.

(21) Appl. No.: 15/902,222

(22) Filed: Feb. 22, 2018

(51) Int. Cl.
| | |
|---|---|
| *G06F 16/23* | (2019.01) |
| *G06F 16/185* | (2019.01) |
| *G06F 16/21* | (2019.01) |
| *G06F 16/22* | (2019.01) |
| *G06F 16/27* | (2019.01) |

(52) U.S. Cl.
CPC ............ *G06F 16/23* (2019.01); *G06F 16/185* (2019.01); *G06F 16/211* (2019.01); *G06F 16/22* (2019.01); *G06F 16/27* (2019.01)

(58) Field of Classification Search
CPC .......... G06F 16/23; G06F 16/27; G06F 16/22; G06F 16/211
See application file for complete search history.

(56) References Cited

U.S. PATENT DOCUMENTS

| | | | | |
|---|---|---|---|---|
| 2006/0218237 A1* | 9/2006 | Buchhop | ................. | H04L 67/55 709/207 |
| 2008/0243866 A1* | 10/2008 | Pandey | .................... | G06F 16/10 |
| 2009/0171867 A1* | 7/2009 | Bilenko | ................ | G06F 16/958 707/999.1 |
| 2012/0173833 A1* | 7/2012 | Lehr | ....................... | G06F 12/08 711/E12.002 |
| 2012/0331029 A1* | 12/2012 | King, III | ................. | G06F 16/27 709/201 |
| 2014/0082310 A1* | 3/2014 | Nakajima | ............. | G06F 12/023 711/E12.103 |
| 2015/0205634 A1* | 7/2015 | McPherson | ........... | G06F 9/5027 718/102 |

(Continued)

OTHER PUBLICATIONS

Casey, "Recovering AWS CloudFormation stacks using ContinueUpdateRollback," Feb. 20, 2018 (Year: 2018).*

*Primary Examiner* — Yu Zhao
(74) *Attorney, Agent, or Firm* — Hogan Lovells US LLP

(57) ABSTRACT

The updating of a definition layer or schema for a large distributed database can be accomplished using a plurality of data store tiers. A distributed database can be made up of many individual data stores, and these data stores can be allocated across a set of tiers based on business logic or other allocation criteria. The update can be applied sequentially to the individual tiers, such that only data stores for a single tier are being updated at any given time. This can help to minimize downtime for the database as a whole, and can help to minimize problems that may result from an unsuccessful update. Such an approach can also allow for simplified error detection and rollback, as well as providing control over a rate at which the update is applied to the various data stores of the distributed database.

19 Claims, 6 Drawing Sheets

(56) References Cited

U.S. PATENT DOCUMENTS

| | | | |
|---|---|---|---|
| 2015/0363271 A1* | 12/2015 | Haustein | G06F 16/1873 |
| | | | 707/682 |
| 2015/0378855 A1* | 12/2015 | Zimoto | G06F 3/0619 |
| | | | 714/6.23 |
| 2016/0321286 A1* | 11/2016 | Chen | G06F 16/172 |
| 2017/0103092 A1* | 4/2017 | Hu | G06F 16/248 |
| 2017/0103116 A1* | 4/2017 | Hu | G06F 16/278 |
| 2018/0121492 A1* | 5/2018 | Sawhney | G06F 16/2365 |
| 2018/0189137 A1* | 7/2018 | De Keyser | H04L 67/1097 |
| 2018/0329931 A1* | 11/2018 | Baid | G06F 16/213 |
| 2019/0087105 A1* | 3/2019 | Singh | G06F 3/064 |
| 2019/0171370 A1* | 6/2019 | Kedia | G06F 3/0608 |
| 2019/0235978 A1* | 8/2019 | Wu | G06F 11/2033 |

* cited by examiner

MULTI-TIER DEFINITION MANAGEMENT FOR DISTRIBUTED DATA STORES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. This allows for the creation of very large distributed databases, which can comprise thousands or even millions of individual data stores. These large databases can be difficult to maintain, however, as the update and management processes can be long and complicated, and can result in significant downtime or unavailability of the entire database.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to managing resources in an electronic environment. In particular, various embodiments provide for the updating of a distributed database using a plurality of data store tiers. A distributed database can be made up of many individual data stores, and these data stores can be allocated across a set of tiers based on various business logic or other allocation criteria. The update can then be applied sequentially to the individual tiers, such that only data stores for a single tier are being updated at any given time. This can help to minimize downtime for the database as a whole, and can help to minimize problems that may result from an unsuccessful update. Such an approach can also allow for simplified error detection and rollback, as well as providing control over a rate at which the update is applied to the various data stores of the distributed database.

Various other functions can be implemented within the various embodiments as well as discussed and suggested elsewhere herein.

Figure 1:
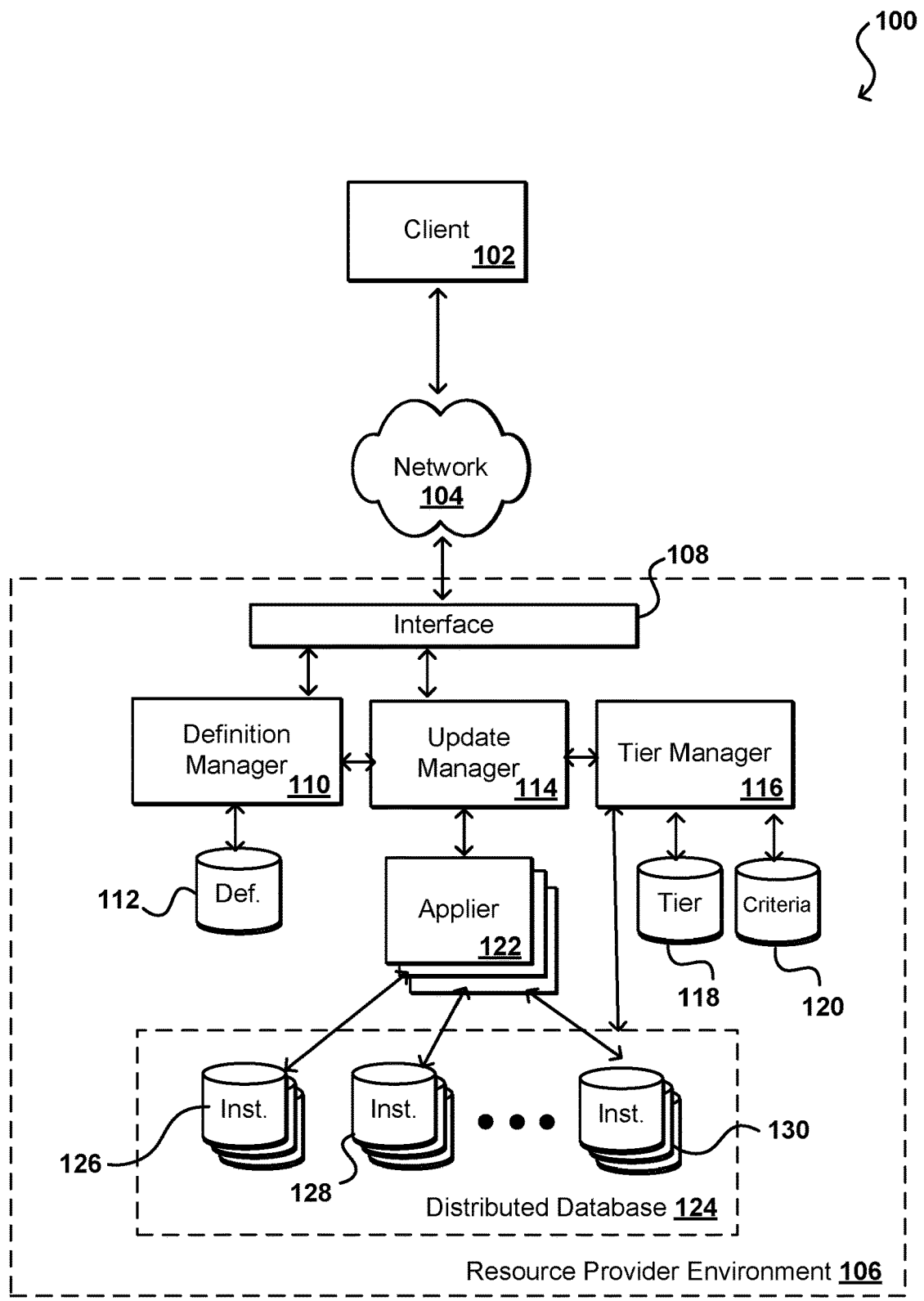
FIG. 1 illustrates an example environment in which aspects of the various embodiments can be implemented.

FIG. 1 illustrates an example environment 100 in which aspects of the various embodiments can be implemented. In this example a user is able to utilize a client device 102, or other such mechanism, to submit requests across at least one network 104 to a resource provider environment 106. The user may be associated with the resource provider, or have an account with the resource provider, which the user can use to gain access to resources in the environment, such as may be used to provide a distributed data store 124. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include content servers and/or application servers for receiving and processing requests, then returning data, webpages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize or access a portion or subset of the resources can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one network server, routing components, load balancers, and the like. When a request to provision, update, or modify a resource is received to the interface layer 108, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource or set of resources, such as may support a distributed data store 124, without having to communicate with the resource manager, at least until such time as a relevant aspect of the user account changes, the user is no longer granted access to the resource, or another such aspect changes.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In this example, the user is authorized to make changes to a distributed database 124 allocated to that user, or an entity with which the user is otherwise associated. A distributed database is referred to as being distributed as it may be comprised of a set of individual data stores, storage devices, or data storage instances, for example, that may be located in different locations or on different machines, and are not all attached to a common processor. In many instances the data will be stored across a network of interconnected storage devices. As mentioned, this may include thousands or potentially millions of individual data stores that may be located in any number of locations and provided using any number of devices, such as data servers located in various data centers. A user can utilize a client device 102 to access data stored in the distributed data store 124, and that data can be located from the appropriate storage instance 126 and returned to the client device (or otherwise processed).

Many types of data stores utilize a definition layer, or other type of definition or schema, that can be used to understand the data that can be stored to those data stores. Updating data store definitions in a conventional relational data store can be relatively straightforward, as the centralized relational data store provides atomicity of the update transaction. Updating can be more complicated for distributed databases, however, as the updates have to be applied to each of the logically-independent data stores that comprise the distributed database. For very large databases with a large number of independent data stores, this can require a significant length of time to accomplish. Depending on factors such as the criticality of the system that relies on the distributed database, a down time during the update can cause significant issues for various dependent systems and services. Similarly, an erroneous update could render the entire database unusable, potentially disturbing the entire ecosystem. It can be desirable in various instances to perform updates such that one problematic update does not cause the entire fleet of data stores to become compromised. The update in at least some embodiments should also be able to recover automatically in the case of an update failure, such as by rolling itself back to its last known good state.

Accordingly, approaches in accordance with various embodiments can divide a distributed database, or other such large data storage allocation, into a set of logical tiers of individual data stores, such as individual data storage instances. The number and types of tiers, and allocation of individual data stores across those tiers, can be based at least in part upon one or more business-driven requirements or other tier allocation criteria. A tier distribution model or algorithm could utilize these requirements or criteria to utilize information about the individual data stores as a baseline for tier placement. The tier manager in some embodiments can determine the number and types of tiers based on at least some of the allocation criterion, although in other embodiments the tiers will be determined ahead of time, or before data store allocation amongst the tiers, based on various business logic or other guidelines as discussed herein. The allocation criteria in at least some embodiments can then be used to analyze the individual data stores to determine the tier to which to allocate each data store or storage instance. As discussed, this can be performed once, periodically, in response to any relevant changes, or for each update, among other such options. In some embodiments an ordering at which tiers are to be updated can also be determined before any updating or at the time of update, etc.

In one embodiment, the information utilized can include priority information for the various individual data stores, wherein the data stores are then assigned to either a low priority, medium priority, or high priority tier. Such an approach has the advantage that the high priority data stores can be updated first in some embodiments, or can be updated only after the update has been validated on lower priority tiers. Another approach can utilize, separately or in combination, the geographical location of the individual data stores, such that the stores can be allocated into regional tiers. Such an approach has the advantage that the failure of an update would only impact a specific region, and if the distributed database has redundant data storage in different geographical locations the data would remain available in spite of the update failure. This can help to reduce the overall blast radius of a particular failure. Various other criteria can be used as well as discussed and suggested herein.

In an approach in accordance with one embodiment, definition updates are performed for a distributed database by dividing the individual data stores into logical tiers using the relevant criteria or rules. Controlled updates can then be performed sequentially, or tier-by-tier, so that a failure will at most impact a single tier of the set. The process can include various error checking and validations, and can provide for retries or rollbacks as appropriate for various failures. A rate of the rollout can be controlled and adjusted as appropriate by, for example, configuring factors such as tier size and parallelization. Such an approach can help critical systems that rely on distributed data stores to update their data definitions in a safe and cost-effective manner. In some situations there may be various other functions or checks performed before the update moves to another tier for updating. For example, there may be data stores within a tier that have redundant copies, and it can be confirmed that the redundant copies are updated as well before moving to another tier. As mentioned, in some embodiments the redundant copies may be allocated to another tier as well. A tier manager or other such system or service can also analyze the data stores to determine the health of the data store, as well as whether the data store should be allocated to a different tier, among other such options.

Referring back to FIG. 1, a user wanting to apply a definition update to a distributed data store 124 can submit the request, which can be directed to a component or service such as a definition manager 110 that stores versions of the definitions in a definition repository 112, such as a metadata store, or other such location. The definition manager can track and manage the version of data definitions across the various data stores. The definition manager 110 can work with an update manager 114, or other such system or service, to cause the update to be applied to the individual data stores 126, 128, 130 of the distributed data store. The update manager 114 can utilize a set of appliers 122 to apply the updates to the individual data stores. The appliers can take any appropriate form for applying the update, as may relate to individual computing devices, processes, applications, virtual machines, task-specific resources, or machine instances, among other such options. Prior to the update, in response to the update request, or at another appropriate time, a system or service such as a tier manager 116 can analyze the data stores of the distributed database 124 using one or more tier allocation criteria stored in a criterion repository 120 or other such location. The tier manager can determine a number of tiers to be allocated for the distributed data store, where that number may vary over time for a number of different reasons including those discussed and suggested herein. The tier manager can also utilize that information to determine which of those tiers should be assigned to each of the individual data stores 126, 128, 130 of the distributed database 124. Information for the tiers, such as which data stores are assigned to a specific tier, can be stored to a tier repository 118 or other such location. The update manager 114 can then work with the relevant appliers 122 to apply the update to a selected tier of the set of tiers. The update manager can cause the tier update to be validated, then if successful can cause the update to continue to the next tier (using the same or different appliers) until all tiers are updates successfully, the update is rolled back, or another completion criterion is satisfied.

In this example, the update manager 114 can be the primary system or service tasked with updating definitions across the various data stores. In one embodiment, the update manager can provide various interfaces that can be utilized for a given update. This can include interfaces such as:

Update (new_definition_version, tier_identifier), which returns an update_identifier for state tracking GetStatus(update_identifier), which returns the status for that identifier For an example update process, the user can issue an update request that will be received to the update manager. The update manager can contact the tier manager to obtain a list of data stores in a given tier, and can contact the definition store to get the definition for the new definition version. For the data stores in a given tier to be updated, the state of the data store can be stored to a ledger, and that data store can be locked to apply the new definition version. Once the new definition is applied to a given data store, a validation test can be executed, and if successful the lock on the data store can be removed. The state information in the ledger can then be updated to indicate a successful update. If the validation test fails, the update can be retried. If unsuccessful after a determined number of retries, the state for the data store can be updated as failed, and a remedial action can be taken. This can include, for example, allocating a new data store in the event of a single failure, or rolling back the update to all data stores in the event of a large scale failure, among other such options.

In various embodiments, the state of the update can be tracked at the individual data store level, as well as at the tier and overall database level. Such state tracking can help to provide visibility into the health of the overall system. In some embodiments, the update manager 114 can provide an interface, such as the getStatus interface, for users to query the current update progress as discussed previously. Various embodiments also provide for error detection and rollback on a data store and/or tier level. The appliers 122 can be responsible for applying the definition update to one or more respective data stores, and potentially a rollback if required as discussed elsewhere herein. If the update for a data store succeeds, the relevant applier can run a set of validation tests to ensure the correctness of update. If the definition update process fails or validation tests fail, the relevant applier can retry a specified number of times to perform the definition update. If these attempts all fail, the applier 122 can perform a rollback of the data store definition and report the update status as "failed" to the update manager. If the rollback itself fails, the applier 122 can report the data store status as "unhealthy" to update manager, among other such options, which can cause a new data store to be allocated as discussed elsewhere herein.

As mentioned, the multi-tier approach can also provide for a reduced blast radius, or scope of impact, or a failed update. A distributed database can be segregated into a set of smaller isolated regions or subsets of data stores, enabling updates to be rolled out in an isolated manner. As mentioned, in at least some embodiments business requirements can drive the placement of a data store into a specific tier. In a low criticality system where availability requirements are relaxed, for example, tiers can each have a relatively large number of data stores which can all be updated in parallel. For a higher criticality system with strict availability requirements, there may be a larger number of smaller tiers where updates are rolled out more carefully. As the number of data stores in a distributed database increases, the update time for the overall system increase as well. To help mitigate this increased time requirement, the update manager in at least some embodiments can permit parallel updates within a tier. Parallel updating can allow customers to tailor their tiers to favor faster or slower updates, which can balance the need for some systems to update quickly with the need in other systems to move slowly to minimize any issues from an unsuccessful update attempt. Increased parallelization can decrease the overall update time for the tier but increase the blast radius, while decreased parallelization can have the opposite effect. Business requirements can drive the risk tolerance level in some embodiments, which can in turn determine the update speed for overall system. It should also be mentioned that the update does not always need to be an update to a new definition version, but can involve a rollback to a previous version or change to another such state in at least some embodiments. Further, in some embodiments an update may be rolled out to all the data stores and validated, but only activated once the update is validated for the entire distributed database.

As mentioned, an update of the database can relate to various aspects, such as updates to a definition, definition layer, or schema for the database. As known for such purposes, a database schema can define the organization or construction of the database, including information as to the tables or other locations to which data can be stored. The schema or definition can also specify the types or formats of data that can be stored to the database, among other such options. Certain directories can have specific facets and attributes for the data to be stored, and these can be stored as metadata in the respective schema. A facet can relate to, or include, a collection of attributes, which can indicate the types of data structures that can be implemented, as may relate to data types, names, etc. In at least some embodiments a facet can define additional information about one or more of the attributes. As known for such purposes, there may be limits on the amount to which a given schema or definition can be updated for a given database, and in some embodiments at least some testing or validation of the update may be performed before attempting to update any of the data stores used to store live data.

Figure 2A:
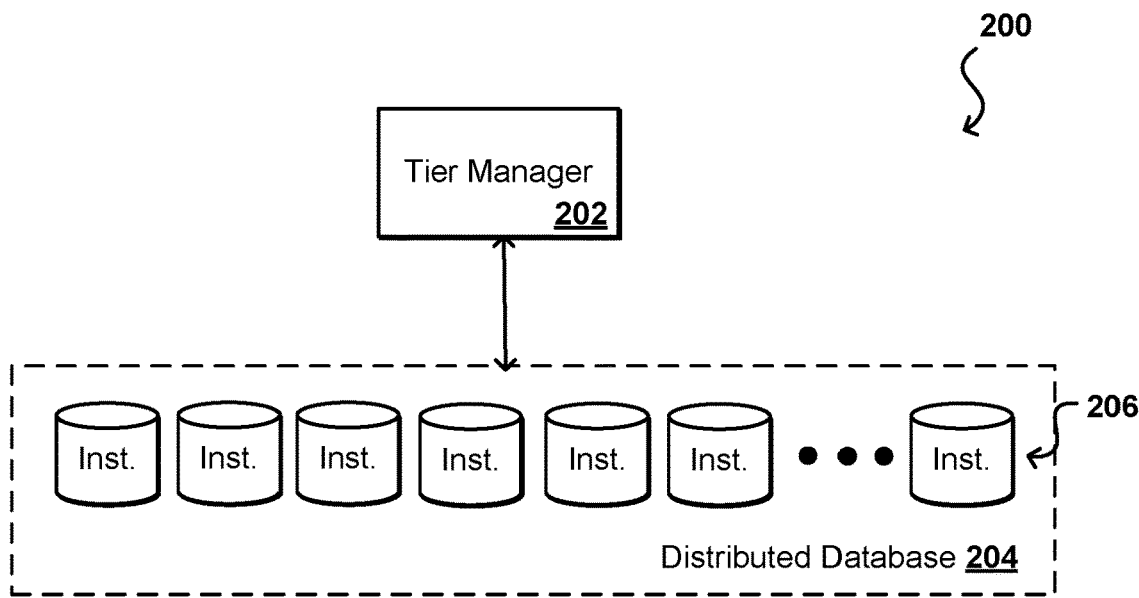
FIGS. 2A and 2B illustrate an example approach to separating instances of a distributed data store into logical tiers that can be utilized in accordance with various embodiments.
Figure 2B:
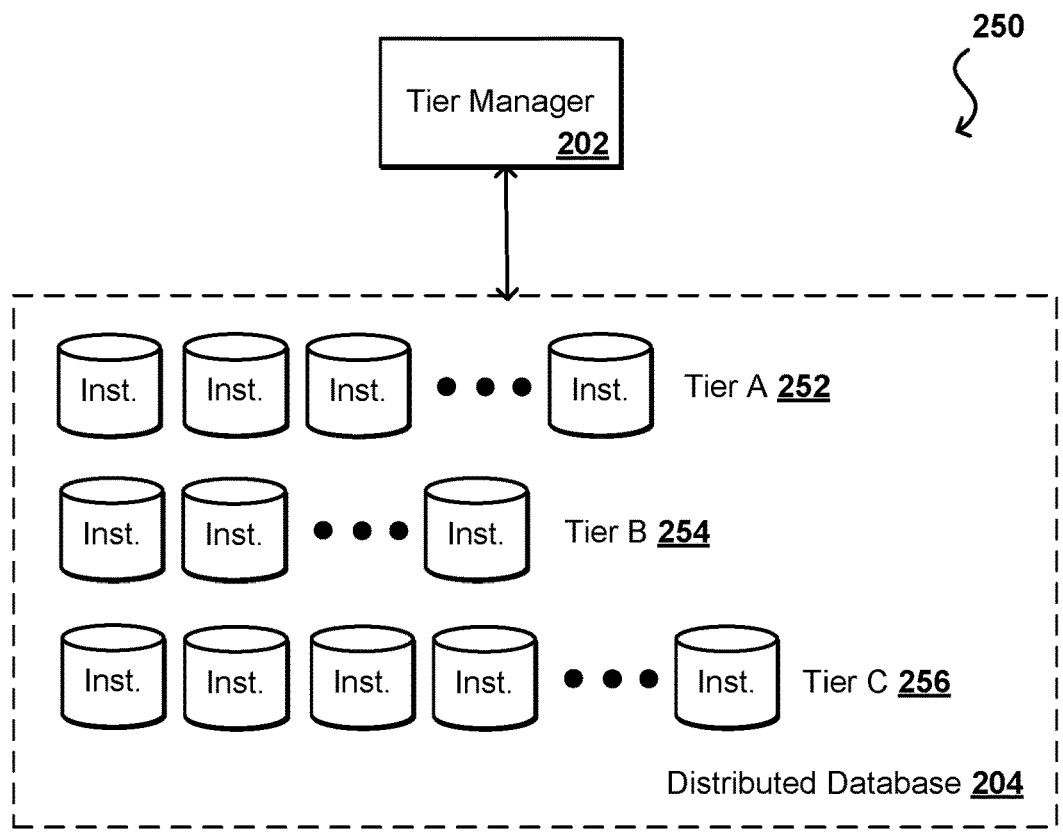

FIG. 2A illustrates an example distributed database configuration 200 that can be utilized in accordance with various embodiments. In this example, a distributed database 204 includes a large number of "equivalent" data stores 206, or data storage instances, although in some embodiments the data stores may be of different types, sizes, or configurations, etc. For the case of logically equivalent data stores, a definition update could be applied similarly to each of the individual data stores, which could be separated geographically or in different machines or data centers, among other such options. In order to provide for various advantages discussed herein, a component such as a tier manager 202 can divide the various data stores into a number of different tiers 252, 254, 256 as illustrated in the example configuration 250 of FIG. 2B. There may be various criteria used to determine the number and type of each tier, as well as the type of data store that will be allocated to each tier. As illustrated, in at least some embodiments the number of data stores allocated to the various tiers can differ, although in some embodiments an attempt can be made to relatively evenly distribute the data stores across the various tiers. As used herein, a "tier" refers to a logical collection or subset of data stores of a distributed data stores, and need to refer to a specific row or level unless convenient for understanding of priority or other such aspects of the various tiers.

As mentioned, there can be various criteria or business logic used to allocate data stores to the various tiers. These can include, as mentioned previously, the priority, sensitivity, or criticality of the individual data stores, or data stored within those stores. The criteria can also relate to location, as in come embodiments geographical separation can be used to determine the relevant tiers. Separation in different devices or data centers may also be used in some embodiments. Aspects such as the size of the data stores or the types of data stored may be used as well. In some instances primary and backup data stores can be grouped into separate tiers, such that if the update fails to one of the redundant copies the other copy will still be available. Certain types of data stores may take longer to update based on these and other such factors, so it may be desirable in some embodiments to cause large data stores to be in the same tier and updated in parallel to minimize the impact of the long update time on other data stores. As mentioned, the number of tiers can also be modified over time as the number, size, or other aspects of the data stores change. Since the tier allocation in at least some embodiments is used only for updating, the tier allocation in some embodiments might be performed each time an update is to be applied, such that the tiers or tier allocations may be different for each individual update.

Figure 3:
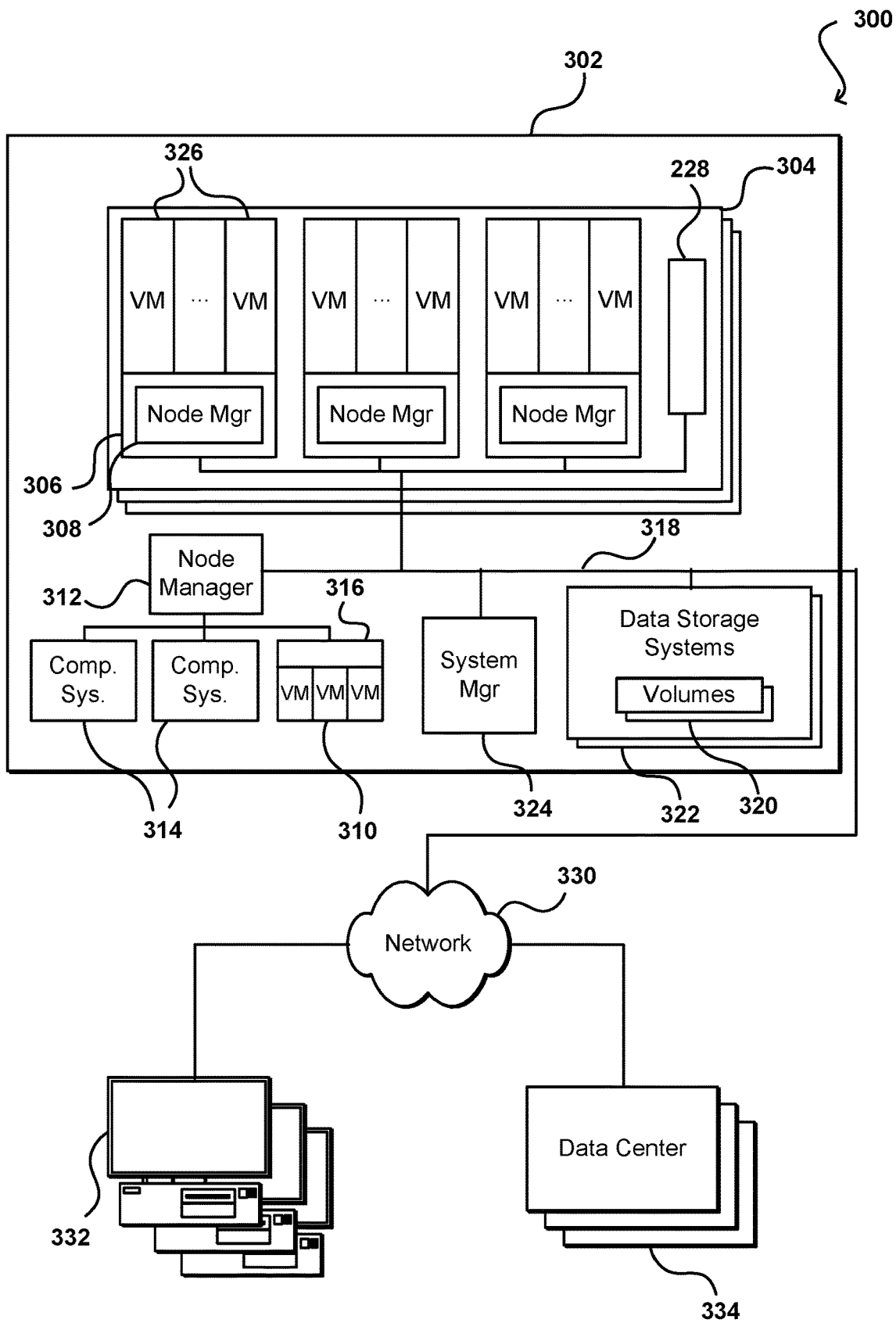
FIG. 3 illustrates components of an example data storage service that can be utilized in accordance with various embodiments.

FIG. 3 illustrates an example network configuration 300 that can be utilized in accordance with various embodiments. In this example configuration, multiple computing systems are operable to execute various programs, applications, and/or services, and further operable to access reliable data storage, such as under the control of a data storage service. In particular, in this example a data storage service uses multiple data storage systems in a data center to provide reliable, non-local, data storage to executing programs or various other components, systems, or services. Multiple remote archival storage systems external to the data center may also be used to store additional copies of at least some portions of at least some data storage volumes.

In this example, a data center 302 includes a number of racks 304, each rack including a number of host computing devices 306, as well as an optional rack support computing system 328 in this example embodiment. The host computing systems 306 on the illustrated rack 304 each host one or more virtual machines 326 in this example, as well as a distinct node manager module 312 associated with the virtual machines on that host computing system to manage those virtual machines. One or more other host computing systems 316 may also each host one or more virtual machines 310 in this example. Each virtual machine 310 may act as an independent resource node for executing one or more program copies or performing another such action or process for user data requests, I/O operations, etc. In addition, this example data center 302 further includes additional host computing systems 314 that do not include distinct virtual machines, but may nonetheless each act as a resource node for one or more tasks being executed for a user. In this example, a node manager module 312 executing on a computing system (not shown) distinct from the host computing systems 314 and 316 is associated with those host computing systems to manage the resource nodes provided by those host computing systems, such as in a manner similar to the node manager modules 308 for the host computing systems 306. The rack support computing system 328 may provide various utility services for other computing systems local to its rack 304 (e.g., long-term program storage, metering, and other monitoring of program execution and/or of non-local data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 302 also includes a computing system 324 that executes a data storage system manager module for the data storage service to assist in managing the availability of non-local data storage to programs executing on resource nodes provided by the host computing systems located within the data center (or optionally on computing systems located in one or more other data centers 334, or other remote computing systems 332 external to the data center). In particular, in this example the data center 302 includes a pool of multiple data storage systems 322, which each have local storage for use in storing one or more volume copies 320. Access to the volume copies 320 is provided over the internal network(s) 318 to programs executing on various resource nodes 310 and 314. As discussed in greater detail elsewhere, a data storage system manager module 324 may provide a variety of services related to providing non-local data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the system manager module 322 may coordinate with the node manager modules 312, 308 to manage use of volumes by programs executing on associated resource nodes, while in other embodiments the node manager modules may not be used to manage such volume use. In addition, in other embodiments, one or more system manager modules 324 may be structured in other manners, such as to have multiple instances of the system manager executing in a single data center (e.g., to share the management of non-local data storage by programs executing on the resource nodes provided by the host computing systems located within the data center), and/or such as to have at least some of the functionality of a system manager module being provided in a distributed manner by software executing on some or all of the server data storage systems 322 (e.g., in a peer-to-peer manner, without any separate centralized system manager module on a computing system 324).

In this example, the various host computing systems, server data storage systems, and computing systems are interconnected via one or more internal networks 318 of the data center, which may include various networking devices (e.g., routers, switches, gateways, etc.) that are not shown. In addition, the internal networks 318 are connected to an external network 330 (e.g., the Internet or another public data network) in this example, and the data center 302 may further include one or more optional devices (not shown) at the interconnect between the data center and an external network (e.g., network proxies, load balancers, network address translation devices, etc.). In this example, the data center 302 is connected via the external network 330 to one or more other data centers 334 that each may include some or all of the computing systems and storage systems illustrated with respect to data center 302, as well as other remote computing systems 332 external to the data center. The other computing systems 332 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems 322 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 3 has been simplified for the purposes of explanation, and that the number and organization of host computing systems, server data storage systems and other devices may be much larger than what is depicted in FIG. 3. For example, as one illustrative embodiment, there may be thousands of computing systems per data center, with at least some of those computing systems being host computing systems that may each host fifteen virtual machines or more, and/or with some of those computing systems being data storage systems that may each store several volume copies. If each hosted virtual machine executes one program, then such a data center may execute as many as tens of thousands of program copies at one time. Furthermore, hundreds or thousands (or more) of volumes may be stored on the server data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 3 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 3, for example, a customer can make a Web service call into an appropriate API of a Web service layer of the system to provision a data volume and attach that volume to a data instance for that customer. The management system can be thought of as residing in a control plane, or control environment, with the data volumes and storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetachVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 4:
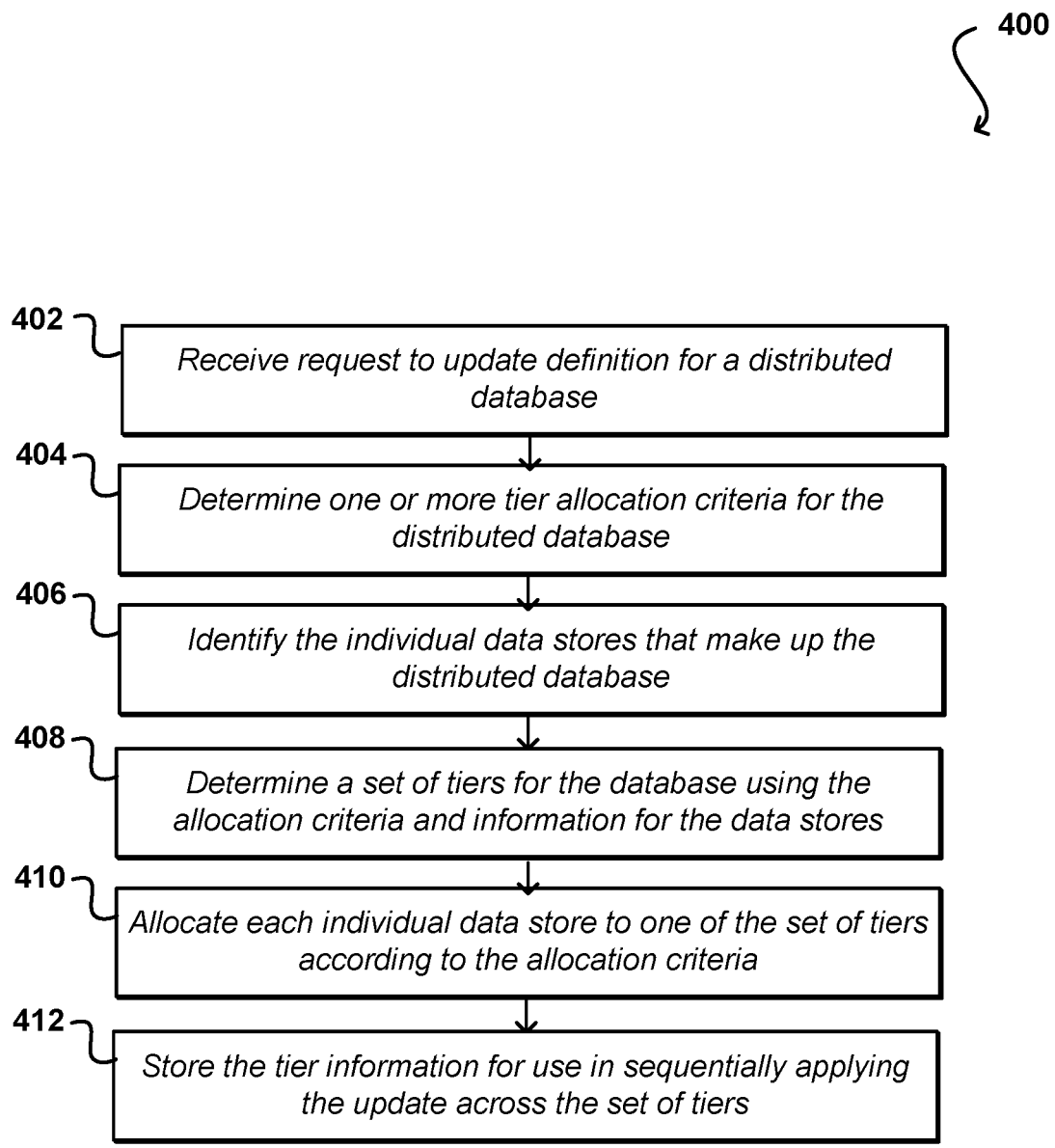
FIG. 4 illustrates an example process for allocating individual data stores to tiers of a distributed database that can be utilized in accordance with various embodiments.

FIG. 4 illustrates an example process 400 for allocating individual data stores of a distributed database across a plurality of tiers that can be utilized in accordance with various embodiments. It should be understood for the various processes described herein that additional, fewer, or alternative steps can be performed in similar or alternative orders, or in parallel, within the scope of the various embodiments unless otherwise stated. In this example, a request is received 402 to update the definition (or definition layer or schema, etc.) for a distributed database. The request can be generated by any appropriate source, such as a user or application. There may be other types of update requests received as well, as discussed and suggested elsewhere herein. In some embodiments the size or type of the distributed database may be examined, and for certain types of databases the update may be applied using a conventional approach. In this example, one or more tier allocation criteria can be determined 404 that are to be used when updating or modifying the distributed database. As mentioned, the criteria can be based on business rules or logic in some embodiments, and can be specific to a customer, type of database, or type of data stored, among other such options.

In this example, the individual data stores that comprise the distributed database can be identified 406. As mentioned, these can change over time due to factors such as changes in the amount of data stored or failures of certain data stores, among other such options. As mentioned, there may be backup data stores, data stores in multiple geographic locations, or other data stores to be identified as associated with the distributed database, and the data stores can be equivalent or of varying aspects in accordance with various embodiments. Using the allocation criteria and information obtained about the individual data stores, a set of tiers can be determined 408 for use in updating the database. As mentioned, the number of tiers and type of data stores allocated to each tier can vary for each update or modification in at least some embodiments. Further, these tiers are logical groupings used for the update process and do not impact other functionality of the system unless otherwise configured. The individual data stores can then each be allocated 410 to one of the tiers according to the allocation criteria. As mentioned, this can include data stores being allocated by priority, geographical location, size, or other such criteria. The information for the tier allocations can then be stored, either to a repository or in cache, for example, for use in applying an update to the distributed database.

Figure 5:
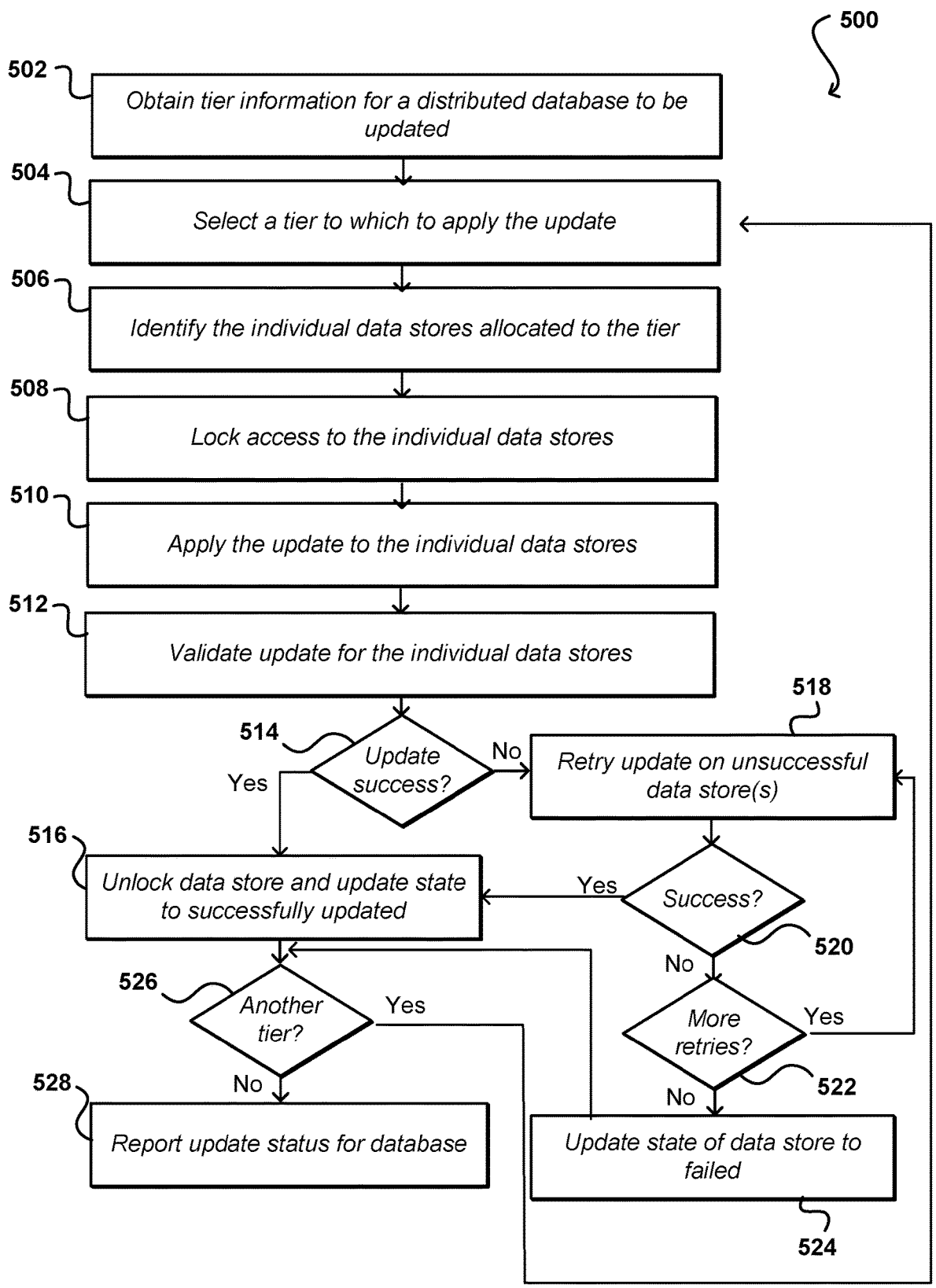
FIG. 5 illustrates an example process for updating a distributed database with logical tiers of individual data stores that can be utilized in accordance with various embodiments.

FIG. 5 illustrates an example process 500 for applying an update to a distributed database that can be utilized in accordance with various embodiments. In this example, an update to a definition layer or schema is to be applied to a distributed database as discussed with respect to the process of FIG. 4. An update manager receiving the update request can contact a tier manager, or other such source, to obtain 502 tier information for the distributed database, including identifying information for the individual data stores assigned to each tier. The update manager in some embodiments can also contact a definition store to obtain the new definition version to be applied. From the tiers, a first tier can be selected 504 to which to apply the update. This might be a high or low priority tier, or any other tier selected using a tier selection criterion as discussed and suggested herein. Using the tier information, the individual stores allocated to the current tier can be identified 506. Access to these data stores can be locked 508 during the update, which can occur for the data stores of the tier at least partially in parallel. State information for the data stores can also be updated to indicate that an update is occurring. The update can then be applied 510 to the individual data stores of the tier. For each data store where the update is applied, the update can be validated 512 to determine whether the update was successful for that data store. If it is determined 514 that the update to a given data store was successful, then the data store access can be unlocked 516 and the data store state updated to reflect the successful update to the new version.

If the update to a specific data store is determined to be unsuccessful, then the update can be retried 518 for that data store. Another validation can be performed, and if it is determined 520 that the update was successful then the data store can be unlocked and state updated accordingly. If not, a determination can be made 522 as to whether there are more retries available, as in some embodiments a retry may be performed up to a maximum number of times, such as up to three times for a given data store. If there are more retries then the update can be retried until the update is either successful or the maximum number of retries is reached. If the update cannot be completed successfully within the maximum number of retries then the state of the data store can be updated 524 to reflect that the update was not successful. A remedial action can then be taken in some embodiments. A user might be enabled to select or specify the action, while in some embodiments a new data store can be provisioned with the updated definition to take the place of the failed data store. As mentioned in some embodiments the failure of a number of data stores may alternatively cause the update to be rolled back to a last known good state, or other previous state, so that the database is available while the cause for the failure is investigated. The process can continue until all tiers are updated successfully or the update is rolled back, among other options discussed and suggested herein. If it is determined 526 that there are no more tiers to process for the update then the update status can be reported 528 and/or updates for the distributed database as a whole. Various other types of information about the update process may be stored or reported as well, such as a number of failures or length of the update process, etc.

Figure 6:
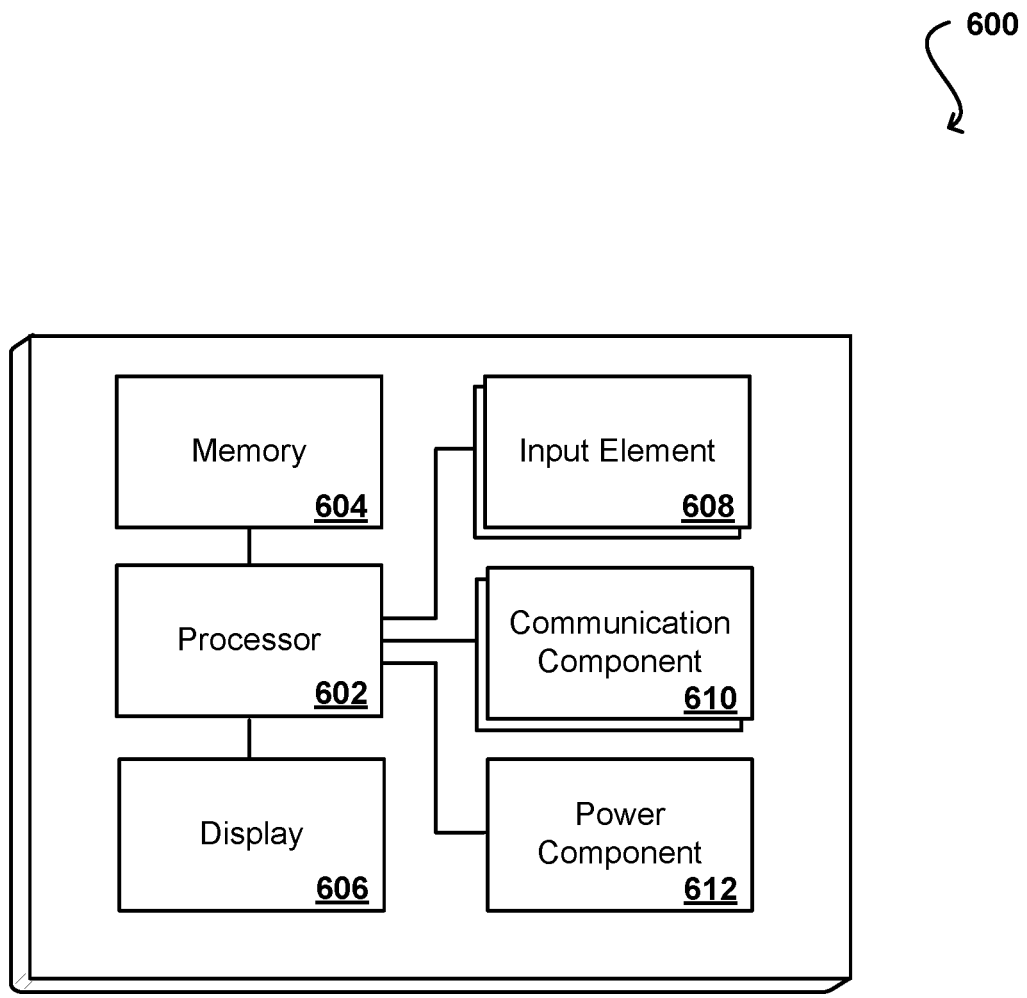
FIG. 6 illustrates components of an example computing device that can be used to perform aspects of the various embodiments.

FIG. 6 illustrates a logical arrangement of a set of general components of an example computing device that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device may include some type of display element 606, such as a touch screen or liquid crystal display (LCD), although devices such as portable media players might convey information via other means, such as through audio speakers. In some embodiments, the computing device 600 can include one or more networking and/or communication elements 608, such as a Wi-Fi, Bluetooth, RF, wired, or wireless communication system. The device in many embodiments can communicate with a network, such as the Internet, and may be able to communicate with other such devices. In some embodiments the device can include at least one additional input component 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 612, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
   providing a set of tiers that is associated with storage instances of a distributed data store;

receiving a definition update to be applied to an individual tier of the set of tiers, the definition update defining an organization or construction of the distributed data store;

receiving tier information for the set of tiers identifying individual storage instances assigned to each tier of the set of tiers, the individual storage instances being assigned to respective tiers of the set of tiers based on one or more tier allocation criteria;

identifying, using the tier information and the one or more tier allocation criteria, a first tier of the set of tiers based in part on the storage instances assigned to the first tier of the set of tiers;

applying the definition update to the identified storage instances of the first tier while maintaining access to the remaining storage instances of the first tier;

determining the definition update failed;

determining that the definition update is associated with a threshold number of retries greater than a current number of attempts;

in response to determining the current number of attempts is less than the threshold number of retries, causing a retry attempt to apply the definition update to the identified storage instances;

determining the definition update failed another time;

determining the definition update is associated with the threshold number of retries equal to an updated current number of attempts;

in response to determining the updated current number of attempts is equal to the threshold number of retries, causing a rollback attempt for at least some of the identified storage instances;

determining the rollback attempt failed; and in response to determining the rollback attempt failed, allocating a new storage instance for at least some of the identified storage instances.

2. The computer-implemented method of claim 1, further comprising:

applying the definition update sequentially to other tiers of the set of tiers until the set of tiers is successfully updated or a determination is made that the definition update is unable to be successfully applied.

3. The computer-implemented method of claim 1, further comprising:

in response to a determination that the definition update is unable to be successfully applied, rolling back to an earlier definition version for storage instances of tiers where the definition update was attempted.

4. The computer-implemented method of claim 1, further comprising:

determining that the definition update for an identified storage instance of a second tier failed to complete successfully; and retrying the update for the identified storage instance until the definition update is able to be validated or a maximum number of retries is reached for the identified storage instance.

5. The computer-implemented method of claim 1, further comprising:

updating state information for the storage instances of the first tier during the applying of the definition update.

6. A computer-implemented method, comprising:

providing a set of tiers that is associated with a plurality of storage instances of a distributed data store;

receiving a schema update to be applied to an individual tier of the set of tiers, the schema update defining an organization or construction of the distributed data store;

determining, using tier identification information and one or more tier allocation criteria, the individual tier of the set of tiers to which the schema update is to be applied;

applying the schema update to at least some of the storage instances associated with the individual tier of the set of tiers while maintaining access to the remaining storage instances of the first tier;

determining the schema update failed;

determining that the schema update is associated with a threshold number of retries greater than a current number of attempts;

in response to determining the current number of attempts is less than the threshold number of retries, causing a retry attempt to apply the schema update to at least some of the storage instances associated with the individual tier of the set of tiers;

determining the schema update failed another time;

determining the schema update is associated with the threshold number of retries equal to an updated current number of attempts;

in response to determining the updated current number of attempts is equal to the threshold number of retries, causing a rollback attempt for at least some of the storage instances associated with the individual tier of the set of tiers;

determining the rollback attempt failed; and in response to determining the rollback attempt failed, allocating a new storage instance for at least some of the storage instances associated with the individual tier of the set of tiers.

7. The computer-implemented method of claim 6, further comprising:

determining the one or more tier allocation criteria for the distributed data store; and determining the storage instances of the plurality of storage instances to be associated with one or more tiers of the set of tiers based at least in part upon the one or more tier allocation criteria.

8. The computer-implemented method of claim 7, wherein the one or more tier allocation criteria relates to at least one of a size, type, priority, physical location, or logical location of storage instances to be allocated to the one or more tiers.

9. The computer-implemented method of claim 7, further comprising:

determining information for the plurality of storage instances; and allocating subsets of the storage instances to the one or more tiers of the set according to the one or more tier allocation criteria.

10. The computer-implemented method of claim 7, further comprising:

validating that the schema update is successfully applied to a recently updated tier before applying the schema update to a next tier of the set of tiers.

11. The computer-implemented method of claim 7, further comprising:

controlling a rate of the applying of the schema update by determining a maximum number of the storage instances in a respective tier to which the schema update can be applied in parallel.

12. The computer-implemented method of claim 6, further comprising:

updating state information for the storage instances during the applying of the schema update.

13. The computer-implemented method of claim 6, further comprising:
applying the applying the schema update sequentially to tiers in the set of tiers until all the tiers are successfully updated or a determination is made that the schema update is unable to be successfully applied.

14. The computer-implemented method of claim 6, further comprising:
in response to a determination that the schema update is unable to be successfully applied, rolling back to an earlier schema version for storage instances of identified tiers where the schema update was attempted.

15. A system, comprising:
at least one processor; and
memory including instructions that, when executed by the at least one processor, cause the system to:
provide a set of tiers that is associated with a plurality of storage instances of a distributed data store;
receive a schema update to be applied to an individual tier of the set of tiers, the schema update defining an organization or construction of the distributed data store;
determine, using tier identification information and one or more tier allocation criteria, the individual tier of the set of tiers to which the schema update is to be applied;
apply the schema update to at least some of the storage instances associated with the individual tier of the set of tiers while maintaining access to the remaining storage instances of the first tier;
determine the schema update failed;
determine that the schema update is associated with a threshold number of retries greater than a current number of attempts;
in response to determining the current number of attempts is less than the threshold number of retries, cause a retry attempt to apply the schema update to at least some of the storage instances associated with the individual tier of the set of tiers;
determine the schema update failed another time;
determine the schema update is associated with the threshold number of retries equal to an updated current number of attempts;
in response to determining the updated current number of attempts is equal to the threshold number of retries, cause a rollback attempt to at least some of the storage instances associated with the individual tier of the set of tiers;
determine the rollback attempt failed; and
in response to determining the rollback attempt failed, allocate a new storage instance for at least some of the storage instances associated with the individual tier of the set of tiers.

16. The system of claim 15, wherein the instructions when executed further cause the system to:
determine the one or more tier allocation criteria for the distributed data store; and
determine the storage instances of the plurality of storage instances to be associated with one or more tiers of the set of tiers based at least in part upon the one or more tier allocation criteria.

17. The system of claim 16, wherein the one or more tier allocation criteria relates to at least one of a size, type, priority, physical location, or logical location of data stores to be allocated to the one or more tiers.

18. The system of claim 16, wherein the instructions when executed further cause the system to:
determine information for the plurality of data stores; and
allocate subsets of the data stores to the one or more tiers of the set of tiers according to the one or more tier allocation criteria.

19. The system of claim 16, wherein the instructions when executed further cause the system to:
validate that a second schema update is successfully applied to a recently updated tier before applying the second schema update to a next tier of the set of tiers.

* * * * *